(12) United States Patent
Haddad (10) Patent No.: US 8,527,317 B2
(45) Date of Patent: Sep. 3, 2013

(54) SERVICE LEVEL AGREEMENT WORK PRIORITIZATION SYSTEM

(75) Inventor: Sidney Martinez Haddad, Valinhos (BR)

(73) Assignee: International Business Machines Corporation, Armonk, NY (US)

( * ) Notice: Subject to any disclaimer, the term of this patent is extended or adjusted under 35 U.S.C. 154(b) by 189 days.

(21) Appl. No.: 13/039,527

(22) Filed: Mar. 3, 2011

(65) Prior Publication Data

US 2012/0226518 A1 Sep. 6, 2012

(51) Int. Cl.
*G06Q 10/06* (2012.01)
(52) U.S. Cl.
CPC .............................. *G06Q 10/0635* (2013.01)
USPC ....................................................... 705/7.28
(58) Field of Classification Search
CPC ................................................ G06Q 10/0635
USPC ............................................. 705/7.29, 7.28
See application file for complete search history.

(56) References Cited

U.S. PATENT DOCUMENTS

| | | | |
|---|---|---|---|
| 5,893,905 A | 4/1999 | Main et al. | |
| 6,556,659 B1 | 4/2003 | Bowman-Amuah | |
| 6,917,979 B1* | 7/2005 | Dutra et al. | 709/229 |
| 7,523,041 B2 | 4/2009 | Chen et al. | |
| 7,568,133 B1 | 7/2009 | Bette et al. | |
| 7,574,502 B2 | 8/2009 | Clymer et al. | |

(Continued)

FOREIGN PATENT DOCUMENTS

| | | |
|---|---|---|
| EP | 1772820 | 11/2007 |
| WO | 2005008553 | 1/2005 |

OTHER PUBLICATIONS

Chun K. Chan, Uma Chandrashekhar, Steven H. Richman, and S. Rao Vasireddy, The Role of SLAs in Reducing Vulnerabilities and Recovering from Disasters, Bell Labs Technical Journal 9(2), 189-203 (2004) © 2004 Lucent Technologies Inc. Published by Wiley Periodicals, Inc., http://onlinelibrary.wiley.com/doi/10.1002/bltj.20035/pdf.*

(Continued)

*Primary Examiner* — Peter Choi
*Assistant Examiner* — Kurtis Gills
(74) *Attorney, Agent, or Firm* — George R. McGuire; Bond Schoeneck & King (57) ABSTRACT

A service task request ordering or prioritization system which has the intelligence to check all incidents on accounts supported by the Delivery Team in the current month, check the customer Service Level Agreement ("SLA"), check monthly ticket number average and calculate for a customer (or all customers) a priority level. The priority level assigned to a customer may be relative to other customers, or it may be an absolute indication of priority without regard to other customers. With this information, when a new ticket is opened, if this ticket is crucial to maintain the SLA according to the contract, the ordering will be based upon the priority level. For example, a light and/or sound alarm may turn on to indicate to the Delivery Team that a new ticket requires urgent attention based on its calculated priority level. This automation of priority level determination and/or the indications of priority level provided to the Delivery Team will drive them to fix the crucial tickets more quickly to avoid or minimize violations of the SLAs of the various customers. There is an accessible database which has information about tickets, and numbers of tickets in past periods. The system uses this ticket number information from past periods to determine risk attributes and/or prioritization levels.

12 Claims, 3 Drawing Sheets

| Month | Opened Tickets | Tickets Not Meeting SLA Deadline ("Lost Tickets") | % Lost | % SLA +/- |
|---|---|---|---|---|
| Jul | 1000 | 2 | 0.2 | -1.8 |
| Aug | 1200 | 22 | 1.8 | -0.2 |
| Sep | 1100 | 18 | 1.6 | -0.4 |
| Oct (in progress) | 400 | 15 | 3.75 | +1.75 |

100

(56) References Cited

U.S. PATENT DOCUMENTS

| | | |
|---|---|---|
| 7,600,007 B1 | 10/2009 | Lewis |
| 7,916,634 B2* | 3/2011 | Synnestvedt et al. ......... 370/230 |
| 2004/0128186 A1* | 7/2004 | Breslin et al. ................... 705/10 |
| 2004/0215430 A1* | 10/2004 | Huddleston et al. .............. 703/2 |
| 2005/0261933 A1 | 11/2005 | Magnuson |
| 2006/0233311 A1 | 10/2006 | Adams et al. |
| 2007/0087756 A1* | 4/2007 | Hoffberg ...................... 455/450 |
| 2008/0168446 A1 | 7/2008 | Shen et al. |
| 2008/0263077 A1 | 10/2008 | Boston |
| 2009/0213874 A1* | 8/2009 | Levit ............................. 370/468 |
| 2009/0219940 A1 | 9/2009 | Jansson |
| 2010/0083145 A1* | 4/2010 | Schang et al. ................ 715/760 |
| 2010/0280861 A1* | 11/2010 | Rossen et al. .................... 705/7 |
| 2011/0054968 A1* | 3/2011 | Galaviz ....................... 705/7.28 |

OTHER PUBLICATIONS

Lundy Lewis and Gabi Dreo, Extending Trouble Ticket Systems to Fault Diagnostics, IEEE Network, Nov. 1993, pp. 44-51.

* cited by examiner

| Month | Opened Tickets | Tickets Not Meeting SLA Deadline ("Lost Tickets") | % Lost | % SLA +/- |
|---|---|---|---|---|
| Jul | 1000 | 2 | 0.2 | -1.8 |
| Aug | 1200 | 22 | 1.8 | -0.2 |
| Sep | 1100 | 18 | 1.6 | -0.4 |
| Oct (in progress) | 400 | 15 | 3.75 | +1.75 |

Fig. 1 
100

| Month | Opened Tickets | Tickets Not Meeting SLA Deadline ("Lost Tickets") | % Lost | %SLA +/- |
|---|---|---|---|---|
| Jul | 200 | 0 | 0.0 | -5.0 |
| Aug | 250 | 22 | 8.8 | +3.8 |
| Sep | 180 | 18 | 10.0 | +5.0 |
| Oct (in progress) | 210 | 10 | 4.8 | -0.2 |

SERVICE LEVEL AGREEMENT WORK PRIORITIZATION SYSTEM

BACKGROUND

1. Field of the Invention

The present invention relates to systems, methods and/or software for performing Service Level Agreements ("SLAs") and more particularly to systems, methods and/or software for performing ticketing-related operations under Service Level Agreements ("SLAs").

2. Description of the Related Art

As used herein, SLA means a service contract that specifies time constraints on at least one aspect of the performance of the service. For example, customers may open tickets under a service agreement, and the associated SLA typically puts constraints on how much response time a delivery team is given to respond to the ticket (that is, partially respond and/or fully respond). More specifically, a typical SLA will put a constraint as to what percentage of ticket responses must meet the applicable SLA deadlines. Different customers may have different SLA deadlines in terms of how much time is allotted for the specified ticket response. Different customers may also have on-time percentage term as far as percentage of opened tickets that are supposed to meet the deadline(s) applicable for that customer. For example, Customer A may have a 98% on-time percentage term in its SLA, while a Customer B may have a 95% on-time percentage term in its SLA. It is known that it is generally better to meet all the SLA terms of all customers to the extent that that is feasible.

SUMMARY

The present invention recognizes that sometimes SLA terms are not met as well as they could be because of prioritization problems—that is, with problems ordering service request tasks in an optimal order. The present invention recognizes that this is a problem for both Delivery Teams with a fixed set of available resources (for example, people, tools) and for Delivery Teams that may selectively call upon more resources on an as-needed basis.

The present invention is directed to a an SLA task ordering method, system and software that uses the number of service requests from past SLA time periods to help predict the number and/or possible range of service requests in the present time period and to calculate a risk attribute and/or a prioritization level for the new service request (at least partially) on this basis. In some preferred embodiments of the present invention, Process Behavior Analysis ("PBA") techniques are used to predict numbers and/or possible ranges of numbers of service requests for a given customer for the current time period.

Various embodiments of the present invention may exhibit one or more of the following objects, features and/or advantages:

(i) decrease number of SLA contracted lost;
(ii) documented facts to support priority decision;
(iii) less pressure on resources allocated to perform ticket related operations;
(iv) drive to achieve is improved;
(v) possible overproduction reduction;
(vi) better Team Management
(vii) opened ticket Risk Level categorization can improve service delivery;
(viii) improved prioritizing and alerting Delivery Teams when any opened ticket is crucial for SLA;
(ix) improved compliance; and/or
(x) improved customer satisfaction.

According to one aspect of the present invention, a method includes several steps (not necessarily performed in the order discussed, and which may be performed in a temporally overlapping manner to the extent technologically possible). An "entering" step is: entering, by a service provider and a first customer, a first Service Level Agreement ("first SLA"). The first SLA provides for service task requests from the first customer to be performed by the service provider. The first SLA provides for a level of service to be determined, at least in part, by a first performance parameter of the first SLA, a first performance parameter proportion value of the first SLA and a plurality of predetermined time periods of the first SLA. An objective of the first SLA is to ensure that the first performance parameter is fulfilled for at least a proportionate number of service task requests of the first customer as specified by the first performance proportion value over the course of each predetermined time period of the first SLA. An "initially-operating" step is: initially operating under the first SLA for sufficient time so that a plurality of passed time periods of the plurality of predetermined time periods have passed and a current time period has begun. A "storing" step is: storing a number of service task requests by the first customer under the first SLA for each passed time period. A tracking step (performed subsequent to the initially-operating step) is: tracking a number of first SLA missed requests for the current time period, with a first SLA missed request being any service task request of the current time period that does not fulfill the first performance parameter of the first SLA. A "receiving" step (performed subsequent to the initially-operating step) is: receiving a new service task request from the first customer under the first SLA. A fetching step (performed subsequent to the initially-operating step) is: fetching the number of service task requests by the first customer under the first SLA for each time period of the plurality of passed time periods. A "determining" step (performed subsequent to the fetching step) is: determining at least one current-time-period-expected-service-request parameter(s) for the first customer based, at least in part, on the number of service task requests for passed time periods fetched at the fetching step. A "calculating" step (performed subsequent to the determining step) is: calculating a first risk attribute value for the first customer based, at least in part, upon the least one current-time-period-expected-service-request parameter(s) for the first customer and the number of first SLA missed requests for the current time period tracked at the tracking step.

According to a further aspect of the present invention, a set of software, in the form of machine readable instructions stored on a software storage device, facilitates operations by a service provider under at least a first Service Level Agreement ("first SLA") of a first customer. The first SLA provides that service task requests from the first customer are to be performed by the service provider. A level of service, under the first SLA is determined, at least in part, by a first performance parameter of the first SLA, a first performance parameter proportion value of the first SLA and a plurality of predetermined time periods of the first SLA. An objective of the first SLA is to ensure that the first performance parameter is fulfilled for at least a proportionate number of service task requests of the first customer as specified by the first performance proportion value over the course of each predetermined time period of the first SLA. The set of software includes: a first fetch module; a miss-tracking; an open new ticket module; an expected-volume module; and a risk attribute module. The first fetch module is programmed to fetch a number of service task requests by the first customer under the first SLA for each first SLA passed time period, with the first SLA passed time periods being the predetermined time periods of the first SLA which has passed. The miss-tracking module programmed to track a number of first SLA missed requests for the first SLA current time period, with a first SLA missed request being any service task request of the first SLA current time period that does not fulfill the first performance parameter of the first SLA. The open new ticket module programmed to receive a new service task request from the first customer under the first SLA. The expected-volume module programmed to determine at least one current-time-period-expected-service-request parameter(s) for the first customer based, at least in part, on the number of service task requests for passed time periods fetched by the first fetch module. The risk attribute module programmed to, in response to receipt of the new service request by the open new ticket module, calculate a first risk attribute value for the first customer based, at least in part, upon the least one current-time-period-expected-service-request parameter(s) for the first customer determined by the expected-volume module and the number of first SLA missed requests for the first SLA current time period tracked by the miss-tracking module.

According to a further aspect of the present invention, a computer system facilitates operations by a service provider under at least a first Service Level Agreement ("first SLA") of a first customer. The first SLA provides that service task requests from the first customer are to be performed by the service provider. A level of service is determined, at least in part, by a first performance parameter of the first SLA, a first performance parameter proportion value of the first SLA and a plurality of predetermined time periods of the first SLA. An objective of the first SLA is to ensure that the first performance parameter is fulfilled for at least a proportionate number of service task requests of the first customer as specified by the first performance proportion value over the course of each predetermined time period of the first SLA. The computer system includes: a set of software; a software storage device; and processing hardware. The software storage device is structured and/or connected to store the set of software. The processing hardware is programmed with and is structured and/or connected to execute machine readable instructions of the software stored on a software storage device. The set of software includes: a first fetch module; a miss-tracking; an open new ticket module; an expected-volume module; and a risk attribute module. The first fetch module is programmed to fetch a number of service task requests by the first customer under the first SLA for each first SLA passed time period, with the first SLA passed time periods being the predetermined time periods of the first SLA which has passed. The miss-tracking module is programmed to track a number of first SLA missed requests for the first SLA current time period, with a first SLA missed request being any service task request of the first SLA current time period that does not fulfill the first performance parameter of the first SLA. The open new ticket module is programmed to receive a new service task request from the first customer under the first SLA. The expected-volume module is programmed to determine at least one current-time-period-expected-service-request parameter(s) for the first customer based, at least in part, on the number of service task requests for passed time periods fetched by the first fetch module. The risk attribute module is programmed to, in response to receipt of the new service request by the open new ticket module, calculate a first risk attribute value for the first customer based, at least in part, upon the least one current-time-period-expected-service-request parameter(s) for the first customer determined by the expected-volume module and the number of first SLA missed requests for the first SLA current time period tracked by the miss-tracking module.

BRIEF DESCRIPTION OF SEVERAL VIEWS OF THE DRAWINGS

The present invention will be more fully understood and appreciated by reading the following Detailed Description in conjunction with the accompanying drawings, in which.

DETAILED DESCRIPTION

In many embodiments of the present invention, a single Delivery Team will be receiving newly opened service tickets on an ongoing basis for different customers. These customers may have with different SLA terms. These tickets (or, more generically, these service task requests) will be prioritized in some way. One way is first-come-first-serve wherein newly-opened tickets are at least taken up (and perhaps even closed) in the order received, regardless of the identity of the customer or any other parameters. This method of ordering service task requests may be known in the prior art.

Figure 1:
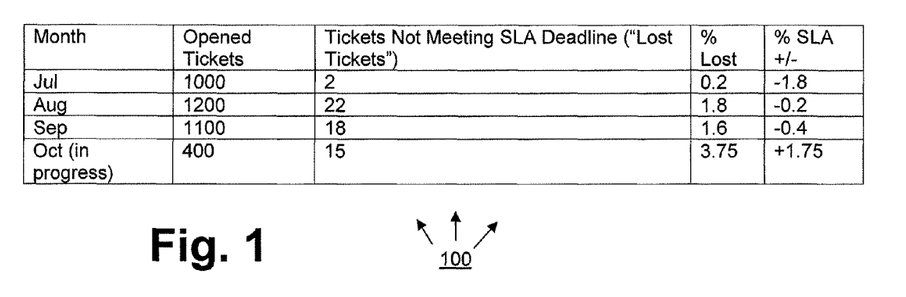
FIG. 1 is a table of customer service request history for use in the present invention.
Figure 2:
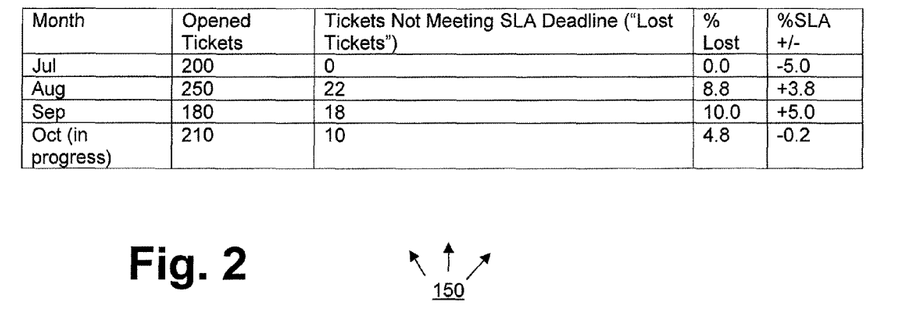
FIG. 2 is another table of customer service request history for use in the present invention.

FIGS. 1 and 2 will be used to help explain some other methods of ordering service task requests. The data of FIGS. 1 and 2 is based on hypothetical Customer A and hypothetical Customer B. These are the only two customers that the hypothetical Delivery Team needs to service in this simple example. Customer A pays for an SLA that specifies a 98% on-time closing of the tickets it opens. Customer B pays for an SLA that specifies a 95% on-time closing of the tickets it opens. FIG. 1 is Customer A table 100 which shows that shows past months' tickets and current month's progress for Customer A with respect to tickets opened and timely closure of tickets. FIG. 2 is Customer B table 100 which shows that shows past months' tickets and current month's progress for Customer A with respect to tickets opened and timely closure of tickets. The rightmost columns of tables 100 and 150 shows the amount (in percent) by which each row is under (negative number) or over (positive number) the applicable on-line percentage term. Under the SLAs, an objective is to make sure that this over/under number is negative for both Customer A and Customer B at the end of each month (in other embodiments of the present invention, other time periods could be used).

In this example using tables 100, and 150, the focus right now is on October because that is the current month in this example, and new tickets are continuing to come in as October progresses in this hypothetical example. One possible way of ordering the work on new tickets as they come in (besides the first-come-first-served method mentioned above) would be to base it upon the over/under respective numbers as they stand so far in the month of October. As shown in the cell in the lowermost, rightmost corner of table 100, Customer A has an over/under of +1.75 and Customer B has an over/under of −0.2. Under this method of ordering, this would indicate that Customer A's new October tickets be given higher priority than Customer B's new October tickets.

This method of ordering service requests may be in the prior art. This method of ordering looks only at the current time period in deciding how new service task requests are prioritized.

According to at least some embodiments of the present invention, ordering of service task requests is: (i) performed, in whole or in part, by a computer running machine readable instructions stored on a tangible medium: and (ii) is based, at least in part, upon analysis of data from pervious time periods defined in the SLAs of the customers. As an example of an embodiment where ordering is performed only in part (not fully automatically) by the computer, a new service request task may be given an urgency level, or priority level, which will indicate to the Delivery Team how relatively important it is to work on the new service request, but under this sort of system and method, the ultimate decision of what to work on and when is still left to the human beings and not the computer. On the other hand, in some embodiments of the present invention, the control of the workflow will ultimately be controlled by software and analysis according to the present invention, and there will be no human being intervention, or discretion, as far as choosing the order in which service tasks are commenced and/or maintained in progress. In many of the following examples, the time periods of the SLAs will be calendar months, and the SLA time periods will be the same for each customer. However, it should be understood that: (i) different customers may have time period bases (for example, monthly versus quarterly versus yearly); and (ii) even customers with the same time period basis (for example, monthly) may have their periods start and end at different times (for example, the first of the month versus the $15^{th}$ of the month).

Also, for embodiments of the present invention that do perform ordering, in whole or in part, based at least in part on data from previous SLA time periods, there may be different kinds of specific ordering. For example, there may be a high priority group of service task requests, a medium priority group of service task requests and a low priority group of service task requests, wherein no medium level tasks are done until all of the high priority tasks are done and none of the low priority tasks are done until all of both the high and medium level tasks are done. As an illustrative alternative ordering scheme, there may be a high priority group of service task requests, a medium priority group of service task requests and a low priority group of service task requests, wherein tasks are commenced by picking the oldest three items rated high, and then two items rated medium and then one item rated low, and then starting this cycle all over again (so long as there are enough items in the high priority and medium priority categories to maintain this ordering). As a further alternative, all priority ratings might be numerical over a continuous range, and the service tasks then commenced in strictly numerical order from highest to lowest. Or the priority levels assigned by the system and methods of the present invention may merely represent a subjective factor for a human being manager to consider along with other extraneous circumstances in ordering the commencement (or continuing work) on various service tasks. To make the points of this paragraph in a different way, ordering is a broad concept, and while at least some embodiments of the present invention generate priority level data to be used in "ordering": (i) the nature of the priority level data may vary widely; and (ii) the manner and/or extent to which the priority level data is used in any subsequent task ordering may also vary widely.

Figure 3:
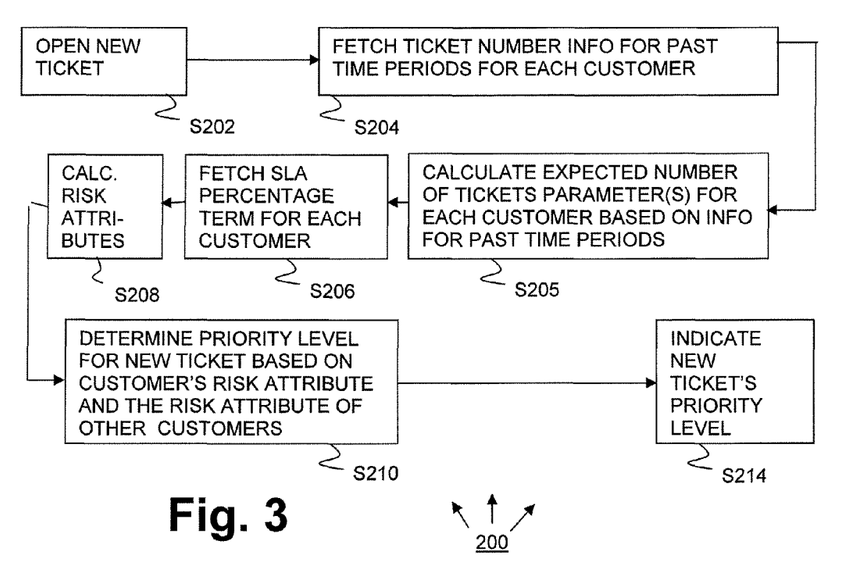
FIG. 3 is a flowchart showing a first embodiment of a method according to the present invention.

A method according to an embodiment of the present invention will now be discussed with reference to FIG. 3, which shows method 200. Unless otherwise indicated, each of these steps is performed by computer software according to an embodiment of the present invention on a computer system (including at least one computer that includes processing hardware) according to an embodiment of the present invention. The software according the embodiment of the present invention programs the computer(s) so that they are different from general purpose computers in that they are specially programmed with machine readable instructions to perform a method according to an embodiment of the present invention.

At step S202 of method 200, a new ticket is opened for one customer (called Customer #1 in this example) among multiple customers. This ticket may be opened, for example, by the customer itself, or by a member of Delivery Team. Processing proceeds to step S204 wherein ticket number info for all customers for some past time periods are fetched from a database. This ticket number info would be generally similar to that shown in column 2 at rows 2, 3 and 4 of table 100 and table 150. However, even within the general concept that ticket number info for past time periods is collected, there may be much variation to optimize performance. As one example, the ticket number info might cover all of the past time periods available for every customer. As a further example, the time periods may only go back a certain predetermined number of time periods for every customer (to the extent that each customer has historical data going back that far). As a further example, for seasonal customers, time periods may be selected to be similar in season to the current time period.

Processing proceeds to step S205 wherein parameter(s) relating to an expected number of tickets for the current time period is calculated for every customer based, at least in part, on the info collected at step S204 for past time periods. Again, the type and number of parameter(s) may vary, but first a preferred parameter set (of two parameters) will be discussed. This preferred parameter set is called the Low Ticket Number ("LTN") and High Ticket Number ("HTN") based on Process Behavior Analysis ("PBA") parameter set. PBA is generally based on control charts, which are also known as Shewhart charts or process-behavior charts. In PBA, statistical process control tools are used to determine whether or not a manufacturing or business process is in a state of statistical control. As is well known, in PBA, upper and lower limits are calculated using mean data for the process history and standard deviation data. For example, a standard error may be calculated from the standard deviation, and the upper and lower limits may be deemed to be some multiple of the standard error. The LTN parameter corresponds to the lower limit obtained by PBA, and the HTN corresponds to the upper limit obtained by PBA.

As mentioned above, the past data collected at step S204 may be used in other ways at step S205 to generate parameters relating to expected ticket number related parameters. For example, step S205 could simply be the calculation of a mean of past periods (that would be a single parameter). Step S205 could determine a median or mode. Step S205 could calculate parameters based on distributions other than standard deviation or standard error, or statistical analysis approaches other than PBA. Step S205's determination of expected ticket numbers could be based, at least in part, on trending data, which is to say, the time derivative of past time periods. For example, let's say that past time periods for a given customer show the following pattern: (i) time period 1=10; (ii) time period 2=100; and (iii) time period 3=1000. In this case, the expected ticket parameter for the current time period might be 10,000. Different methods could be used to generate the expected ticket number parameters for different customers depending upon the amount and pattern of past time period data that that customer has. Even past time period data from other customers might be used. For example, if all customers tended to experience a similar pattern of decreasing ticket numbers in their first six months under the SLA (as initial bugs and glitches are worked out), then a customer with less than six months of past history might have its expected ticket number parameters based upon this past time period data of other customers who have been through the initial six month "burn-in" period.

Processing proceeds to step S206 wherein the SLA on-time percentage term for each customer is fetched from a database. As noted above in connection with tables 100 and 150, different customers may have different SLA on-time percentage terms.

Processing proceeds to step S208 wherein a risk attribute is calculated for each customer. This risk attribute reflects the risk that the SLA percentage term for that customer will not be met for the current time period. It is calculated using that customer's SLA on-time percentage term (collected at step S206) and also on the expected ticket number related parameters (calculated at step S205). The way that the risk attributes are calculated using these inputs may vary, but first a preferred method for calculating the risk attributes will be explained. This preferred method will herein be called the PBA method because it is based upon PBA. Under this method, a customer's HTN, LTN and SLA on-time percentage term ("SLAP") are used to calculate a Low Ticket Missing ("LTM") parameter and a High Ticket Missing ("HTM") parameter as follows: (i) LTM=LTN*(100−SLAP)/100; and (ii) HTM=HTN*(100−SLAP)/100. The risk attribute ("RA") for the customer is then calculated based on its HTM, LTM and current time period lost ticket values according to equation (1) as follows:

$$RA=100*((\text{current lost tickets})-LTM)/(HTM-LTM) \qquad (1)$$

In this equation (1), the term (Current lost tickets) refers to the number of tickets that have not been completed in a timely fashion during the current time period (see tables 100, 150 at column 3, October rows).

To further illustrate this preferred method of calculating RA, risk attributes will be calculated for Customer A based on table 100 (see FIG. 1) and Customer B based on table 150 (see FIG. 2). For Customer A, the ticket numbers for previous time periods are 1000, 1200 and 1100, which, by consulting process control charts and/or PBA calculations, yields an HTN of 1499 and an LTN of 701. Because Customer A's SLA on-time percentage term is 98, this leads to a HTM of 29 and an LTM of 14 for Customer A. As shown in table 100, Customer A's current lost ticket value is 15. By plugging these values into equation (1), Customer A's RA is 0.066 (or 6.6%).

For Customer B, the ticket numbers for previous time periods are 200, 250 and 180, which, by consulting process control charts and/or PBA calculations, yields an HTN of 370 and an LTN of 50. Because Customer A's SLA on-time percentage term is 95, this leads to a HTM of 18 and an LTM of 2 for Customer B. As shown in table 150, Customer B's current lost ticket value is 10. By plugging these values into equation (1), Customer A's RA is 0.50 (or 50%). This means that new tickets from Customer B should be strongly prioritized over new tickets from Customer A because 50% is much higher than 6.6%. It is noted that this is the opposite conclusion than what would be reached by comparing the current month on-time percentage over/under values (tables 100 and 150 at lowermost, rightmost cells) as described above. This method of risk assessment is considered better, and may well change how service tasks are currently ordered.

As mentioned above, there are other ways of calculating risk assessment. Another example is provided below in equation (2):

$$RA=(100*\text{current missing tickets})/(\text{mean ticket number from past periods})-(100-SLAP) \qquad (2)$$

Under the method of equation (2), low RA's will be negative and high RA's will be positive. To apply this method to tables 100 and 150, Customer A has a mean ticket number of 1100 based on July, August and September. Customer A's current missing ticket number for October is 15 and its SLAP is 98. This leads to an equation (2) type RA of 0.7. Customer B has a mean ticket number of 210 based on July, August and September. Customer B's current missing ticket number for October is 10 and its SLAP is 95. This leads to an equation (2) type RA of 0.2. This alternative RA of equation prioritizes Customer A over Customer B, but it does so by looking, at least in part, to ticket number values for prior time periods, rather than just focusing on the current time period.

After RA is calculated at step S208, processing proceeds to step S210 wherein a priority level is determined based on the risk attributes. For example, customers with RA values in the top third may be assigned a high priority level, while customers in the middle third may be assigned a medium priority level, while customers in the lowest third may be assigned a low priority level. As an alternative, customers may be assigned a priority level based on the raw RA score without reference to other customers. For example, if the RA score is greater than some threshold value, then the customer may be assigned high priority, while if another customer is lower than the predetermined threshold, then that other customer may be assigned low priority as the priority value. In this example, the RA does not need to be calculated for a new customer every time a new ticket is received, but, rather, only for Customer X who is the customer corresponding to the new ticket. This method may be preferred when the Delivery Team can temporarily obtain additional resources to quickly perform service tasks on an as-needed basis. On the other hand, if the resources of the delivery team are essentially fixed, then it may not do much good if priority levels are assigned on an absolute basis, rather than a relative basis, and all the priority levels start coming in at the high level.

In still another example, the priority level may be a position in a queue which is based on RA. For example, there may be a queue of service requests waiting in a queue as follows: (i) request 2, Customer N, RA=50%; (ii) request 1, Customer M, RA=25%; and (iii) request 3, customer L, RA=5%. Then a new request (request 4) comes in from Customer K and the associated RA is calculated to be 40%. In this case, the priority levels (that is, the queue positions in this example) would be adjusted as follows: (i) request 2, Customer N, RA=50%; (ii) request 4, Customer K, RA=40%; (iii) request 1, Customer M, RA=25%; and (iv) request 3, customer L, RA=5%. Again, in this example, RA's may not need to be calculated for every customer every time a new ticket is opened. On the other hand, it may be better to re-calculate RA's for each customer (or at least each customer in queue) each time a new ticket is opened because there may be additional information available relating to that customer (such as an updated value for currently missing tickets, which is often used in the RA calculations).

After step S210, processing proceeds to step S214 wherein an indication of the new ticket's priority level is given to the Delivery Team. For example, when the new ticket shows up on their computer displays, it may have a red dot next to it for a high priority new ticket, a yellow dot next to it for a medium priority ticket and a green dot next to it for a low priority ticket. The manager of the Delivery Team may use this information in assigning tasks. For example, she may put her quickest employee on the red service tasks, her medium-speed employee on the yellow tasks and her slowest employee on the green tasks. In this example, the RA values and the priority level values help determine ordering despite the fact that it is actually a human being that is making the ultimate decisions about to whom and when new tasks (or continuing, ongoing tasks) are assigned. This indication to the Delivery Team in embodiments where tasks are assigned and ordered automatically by computer, and without human being intervention. In still other embodiments, tasks may be ordered automatically, by computer, unless and until too many high priority tasks start coming up. That is, the priority levels determined by the present invention may indicate a temporary need for human being intervention in the task ordering process when ordinarily there is none.

Some general variations on method 200 will now be mentioned. One variation that has already been mentioned is that it might not be needed to calculate priority levels and/or RA values for every customer every time a new ticket is opened—it may suffice to only calculate RA for the customer who is opening the currently opening ticket. As a further variation, the SLA objective may not always relate to on-time completion of a service request. For example, the SLA may assign a performance objective in terms of customer satisfaction with the service. In that case the SLA objective would be customer satisfaction ratings, rather than timely completions. In this case Customer A may contract for a 98% satisfaction rating and Customer B may contract for a 95% satisfaction rating. The risk attribute calculation and priority levels might be calculated in a similar fashion, but they would likely be used in a somewhat different way by the Delivery Team. For example, if the key SLA objective was customer satisfaction, then the highest priority service tasks might be given to the most skilled employee, rather than the quickest. However, in at least some of these alternative embodiments, it is important to note that the number of service requests from past time periods would be used to help calculate RA and/or priority level.

As a further variation, the methods described above may be applied selectively based upon how much of the current time period has passed and/or based upon whether there is any realistic hope for meeting the SLA proportional performance term for Customer X for the given time period. For example, if all the current time periods for all customers begin at the same time, then their current missing tickets toward the beginning of the current time period will be at or near zero. In this case, the prioritization help provided by embodiments of the present invention may not help (although they may not hurt either). Under this example, it might be decided to use the prioritization levels of the present invention in the later portions of a given time period. As another example of selective use of the prioritization help of the present invention, a customer might have so many missed tickets so late in the time period that it might be decided to stop giving that customer priority in favor of prioritizing customers where there is still realistic hope of meeting the SLA proportional performance goal for the current time period. Of course, this could be done on an ad hoc basis by the human beings of the Delivery Team, but this selectivity might also be mathematically designed into the algorithms of the SLA task ordering software.

Figure 4:
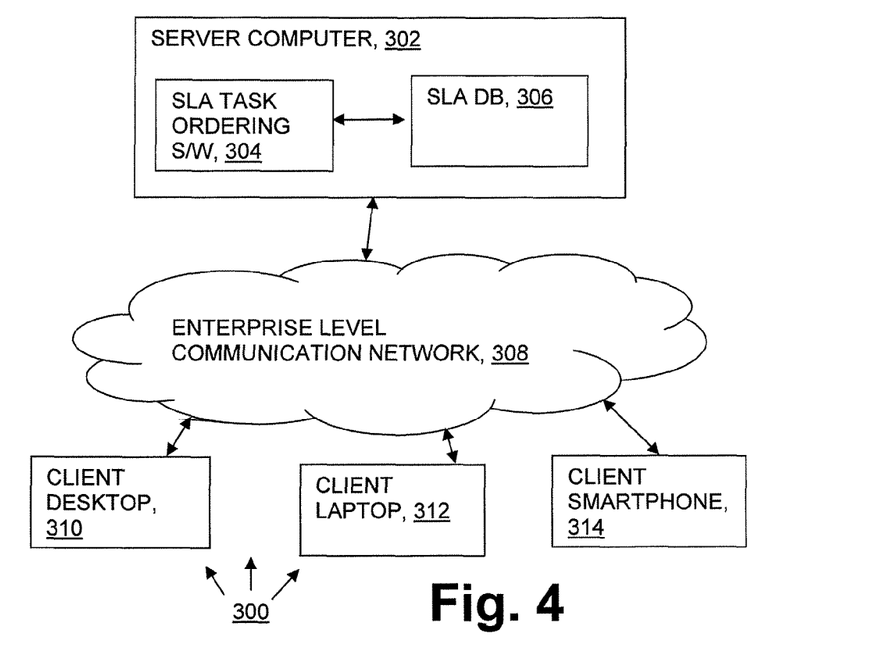
FIG. 4 is a schematic diagram showing a first embodiment of a system according to the present invention.

An exemplary computer system according to an embodiment of the present invention is shown in FIG. 4. Computer system 300 includes: server computer 302; enterprise level communication network 308; client desktop 310; client laptop 312; and client smartphone 314. Server computer 302 includes SLA task ordering software 304 and SLA database 306. In this embodiment, the various client computers 310, 312, 314 send new service task requests that they receive from the SLA customers. Software 304 then calculates risk attributes and priority levels using data obtained from database 306. Alternatively, software 304 and/or database 306 could be more widely dispersed over a greater number of communicating machines, such as in the cloud computing models that are now popular.

Figure 5:
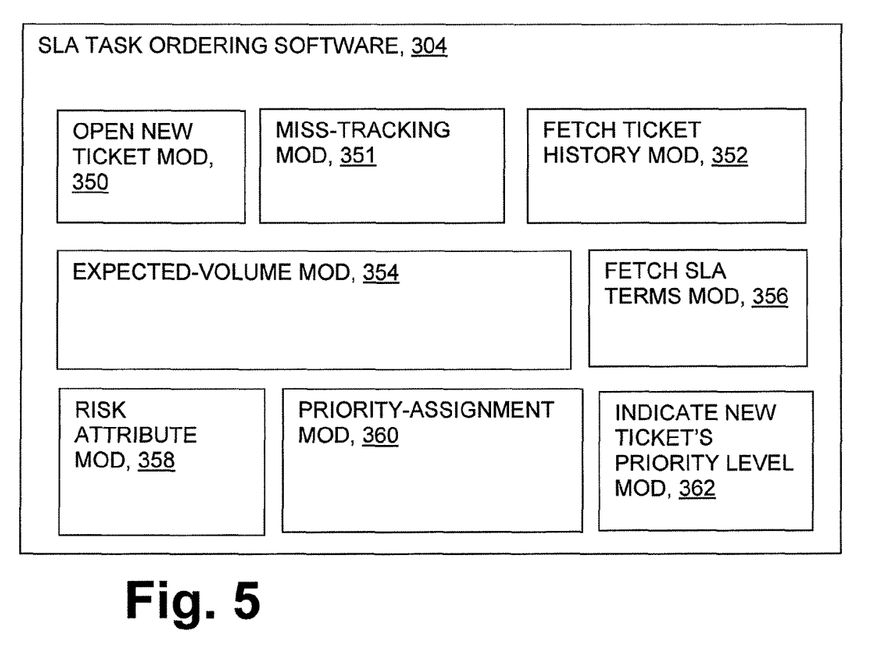
FIG. 5 is a schematic diagram showing a first embodiment of software according to the present invention.

FIG. 5 shows software 304, which includes: an open new ticket module 350; a miss-tracking module 351; a fetch ticket history module 352; an expected-volume module 354; a fetch SLA terms module 356; a risk attribute module 358; a priority-assignment module 360; and an indicate new ticket's priority level module 362. The miss-tracking module tracks how often an SLA performance parameter fails to be met for each customer during (at least) the current time period. For example, it is this miss-tracking module that would track the numbers in the October rows, third column of tables 100 and 150 (see FIGS. 1 and 2).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Any and all published documents mentioned herein shall be considered to be incorporated by reference, in their respective entireties, herein to the fullest extent of the patent law.

Present invention: means at least some embodiments of the present invention; references to various feature(s) of the "present invention" throughout this document do not mean that all claimed embodiments or methods include the referenced feature(s).

Embodiment: a machine, manufacture, system, method, process and/or composition that may (not must) meet the embodiment of a present, past or future patent claim based on this patent document; for example, an "embodiment" might not be covered by any claims filed with this patent document, but described as an "embodiment" to show the scope of the invention and indicate that it might (or might not) covered in a later arising claim (for example, an amended claim, a continuation application claim, a divisional application claim, a reissue application claim, a re-examination proceeding claim, an interference count); also, an embodiment that is indeed covered by claims filed with this patent document might cease to be covered by claim amendments made during prosecution.

First, second, third, etc. ("ordinals"): Unless otherwise noted, ordinals only serve to distinguish or identify (e.g., various members of a group); the mere use of ordinals shall not be taken to necessarily imply order (for example, time order, space order).

Module/Sub-Module: any set of hardware, firmware and/or software that operatively works to do some kind of function, without regard to whether the module is: (i) in a single local proximity; (ii) distributed over a wide area; (ii) in a single proximity within a larger piece of software code; (iii) located within a single piece of software code; (iv) located in a single storage device, memory or medium; (v) mechanically connected; (vi) electrically connected; and/or (vii) connected in data communication.

Software storage device: any device (or set of devices) capable of storing computer code in a non-transient manner in one or more tangible storage medium(s); "software storage device" does not include any device that stores computer code only as a signal.

Unless otherwise explicitly provided in the claim language, steps in method steps or process claims need only be performed in the same time order as the order the steps are recited in the claim only to the extent that impossibility or extreme feasibility problems dictate that the recited step order be used. This broad interpretation with respect to step order is to be used regardless of whether the alternative time ordering(s) of the claimed steps is particularly mentioned or discussed in this document—in other words, any step order discussed in the above specification shall be considered as required by a method claim only if the step order is explicitly set forth in the words of the method claim itself. Also, if some time ordering is explicitly set forth in a method claim, the time ordering claim language shall not be taken as an implicit limitation on whether claimed steps are immediately consecutive in time, or as an implicit limitation against intervening steps.

What is claimed is:

1. A method comprising the following steps:

entering, by a service provider and a first customer, a first Service Level Agreement ("first SLA") that provides for service task requests from the first customer to be performed by the service provider, with a level of service to be determined, at least in part, by a first performance parameter of the first SLA, a first performance parameter proportion value of the first SLA and a plurality of predetermined time periods of the first SLA, with an objective of the first SLA being to ensure that the first performance parameter is fulfilled for at least a proportionate number of service task requests of the first customer as specified by the first performance proportion value over the course of each predetermined time period of the first SLA;

initially operating under the first SLA for sufficient time so that a plurality of passed time periods of the plurality of predetermined time periods have passed and a current time period has begun;

storing a number of service task requests by the first customer under the first SLA for each passed time period;

subsequent to the initially-operating step, tracking a number of first SLA missed requests for the current time period, with a first SLA missed request being any service task request of the current time period that does not fulfill the first performance parameter of the first SLA;

subsequent to the initially-operating step, receiving a new service task request from the first customer under the first SLA;

subsequent to the initially-operating step, fetching the number of service task requests by the first customer under the first SLA for each time period of the plurality of passed time periods;

subsequent to the fetching step, determining according to Process Behavior Analysis ("PBA") methodology at least one current-time-period-expected-service-request parameter(s) for the first customer based, at least in part, on the number of service task requests for passed time periods fetched at the fetching step, wherein the at least one current-time-period-expected-service-request parameter(s) that are determined are a PBA upper limit and a PBA lower limit; and subsequent to the determining step, calculating, using a processor, a first risk attribute value for the first customer based, at least in part, upon the at least one current-time-period-expected-service-request parameter(s) for the first customer and the number of first SLA missed requests for the current time period tracked at the tracking step;

wherein the first risk attribute is calculated by the formula $$(C-(L*P))/(P*(U-L)$$

wherein C equals the number of first SLA missed requests for the current time period for the first customer tracked at the tracking step, L equals the PBA lower limit determined at the determining step, U equals the PBA upper limit determined at the determining step, and P equals the first performance parameter proportion value of the first SLA.

2. The method of claim 1 wherein:

the first performance parameter of the first SLA is a time-based deadline for completing at least some portion of each service task request;

the first performance parameter proportion value of the first SLA is an on-time percentage term;

a number of first SLA missed requests for the current time period is the number of service task requests of the current time period that have not met the time-based deadline of the first SLA; and the first risk attribute reflects the risk that the on-time percentage term will not be met for the first customer for the current time period under the first SLA.

3. The method of claim 1 wherein:

at the storing step, a number of service task requests by the first customer under the first SLA for each passed time period is stored on a software storage device as machine readable data;

at the tracking step, the number of missed requests for the current time period for the first customer is stored on the software storage device as machine readable data;

at the receiving step, the new service task request is received by a computer running machine readable instructions;

at the fetching step, a number of service task requests by the first customer under the first SLA for each passed time period is fetched from the software storage device as machine readable data;

at the determining step, the at least one current-time-period-expected-service-request parameter(s) for the first customer is determined by a computer running machine readable instructions; and at the calculating step, the risk attribute value for the new service task request of the first customer is calculated by a computer running machine readable instructions.

4. The method of claim 1 further comprising the step of:
subsequent to the calculating step, assigning a priority level for the new service task request of the first customer based, at least in part, upon the first risk attribute calculated at the calculating step, with the first priority level indicating a recommended priority of the new service request.

5. The method of claim 4 further comprising the step of:
additionally calculating a plurality of other-customer risk attributes respectively corresponding to a plurality of other customers;
wherein, at the assigning step, the priority level is assigned further based at least in part upon the plurality of other-customer risk attributes.

6. A set of software, in the form of machine readable instructions stored on a software storage device, for facilitating operations by a service provider under at least a first Service Level Agreement ("first SLA") of a first customer, the first SLA providing that service task requests from the first customer are to be performed by the service provider, with a level of service to be determined, at least in part, by a first performance parameter of the first SLA, a first performance parameter proportion value of the first SLA and a plurality of predetermined time periods of the first SLA, with an objective of the first SLA being to ensure that the first performance parameter is fulfilled for at least a proportionate number of service task requests of the first customer as specified by the first performance proportion value over the course of each predetermined time period of the first SLA, the set of software comprising:
a first fetch module programmed to fetch a number of service task requests by the first customer under the first SLA for each first SLA passed time period, with the first SLA passed time periods being the predetermined time periods of the first SLA which has passed;
a miss-tracking module programmed to track a number of first SLA missed requests for the first SLA current time period, with a first SLA missed request being any service task request of the first SLA current time period that does not fulfill the first performance parameter of the first SLA;
an open new ticket module programmed to receive a new service task request from the first customer under the first SLA;
an expected-volume module programmed to determine according to Process Behavior Analysis ("PBA") methodology at least one current-time-period-expected-service-request parameter(s) for the first customer based, at least in part, on the number of service task requests for passed time periods fetched by the first fetch module, wherein the at least one current-time-period-expected-service-request parameter(s) that are determined are a PBA upper limit and a PBA lower limit; and
a risk attribute module programmed to, in response to receipt of the new service request by the open new ticket module, calculate a first risk attribute value for the first customer based, at least in part, upon the at least one current-time-period-expected-service-request parameter(s) for the first customer determined by the expected-volume module and the number of first SLA missed requests for the first SLA current time period tracked by the miss-tracking module;
wherein the risk attribute module is programmed to calculate the first risk attribute by the formula:

$$(C-(L*P))/(P*(U-L));$$

wherein C equals the number of first SLA missed requests for the current time period for the first customer tracked by the miss-tracking module, L equals the PBA lower limit determined by the expected-volume module, U equals the PBA upper limit determined by the expected-volume module, and P equals the first performance parameter proportion value of the first SLA.

7. The set of software of claim 6 wherein:
the first performance parameter of the first SLA is a time-based deadline for completing at least some portion of each service task request;
the first performance parameter proportion value of the first SLA is an on-time percentage term;
a number of first SLA missed requests for the current time period is the number of service task requests of the current time period that have not met the time-based deadline of the first SLA; and
the first risk attribute reflects the risk that the on-time percentage term will not be met for the first customer for the current time period under the first SLA.

8. The set of software of claim 6 further comprising:
a priority-assignment module programmed to assign a priority level for the new service task request of the first customer based, at least in part, upon the first risk attribute calculated by the risk attribute module, with the first priority level indicating a recommended priority of the new service request.

9. The set of software of claim 8 wherein:
the risk attribute module is programmed to calculate a plurality of other-customer risk attributes respectively corresponding to a plurality of other customers; and
the priority-assignment module is programmed to assign the first priority level further based at least in part upon the plurality of other-customer risk attributes.

10. A computer system, for facilitating operations by a service provider under at least a first Service Level Agreement ("first SLA") of a first customer, the first SLA providing that service task requests from the first customer are to be performed by the service provider, with a level of service to be determined, at least in part, by a first performance parameter of the first SLA, a first performance parameter proportion value of the first SLA and a plurality of predetermined time periods of the first SLA, with an objective of the first SLA being to ensure that the first performance parameter is fulfilled for at least a proportionate number of service task requests of the first customer as specified by the first performance proportion value over the course of each predetermined time period of the first SLA, the computer system comprising:
a set of software;
a software storage device structured and/or connected to store the set of software; and
processing hardware programmed with and structured and/or connected to execute machine readable instructions of the software stored on a software storage device;
wherein the set of software comprises:
a first fetch module programmed to fetch a number of service task requests by the first customer under the first SLA for each first SLA passed time period, with the first SLA passed time periods being the predetermined time periods of the first SLA which has passed;
a miss-tracking module programmed to track a number of first SLA missed requests for the first SLA current time period, with a first SLA missed request being any service task request of the first SLA current time period that does not fulfill the first performance parameter of the first SLA;
an open new ticket module programmed to receive a new service task request from the first customer under the first SLA;
an expected-volume module programmed to determine according to Process Behavior Analysis ("PBA") methodology at least one current-time-period-expected-service-request parameter(s) for the first customer based, at least in part, on the number of service task requests for passed time periods fetched by the first fetch module, wherein the at least one current-time-period-expected-service-request parameter(s) that are determined are a PBA upper limit and a PBA lower limit; and
a risk attribute module programmed to, in response to receipt of the new service request by the open new ticket module, calculate a first risk attribute value for the first customer based, at least in part, upon the at least one current-time-period-expected-service-request parameter(s) for the first customer determined by the expected-volume module and the number of first SLA missed requests for the first SLA current time period tracked by the miss-tracking module;
wherein the risk attribute module is programmed to calculate the first risk attribute by the formula:

$(C-(L*P))/(P*(U-L));$ wherein C equals the number of first SLA missed requests for the current time period for the first customer tracked by the miss-tracking module, L equals the PBA lower limit determined by the expected-volume module, U equals the PBA upper limit determined by the expected-volume module, and P equals the first performance parameter proportion value of the first SLA.

11. The computer system of claim 10 wherein:
the first performance parameter of the first SLA is a time-based deadline for completing at least some portion of each service task request;
the first performance parameter proportion value of the first SLA is an on-time percentage term;
a number of first SLA missed requests for the current time period is the number of service task requests of the current time period that have not met the time-based deadline of the first SLA; and
the first risk attribute reflects the risk that the on-time percentage term will not be met for the first customer for the current time period under the first SLA.

12. The computer system of claim 10 further comprising:
a priority-assignment module programmed to assign a priority level for the new service task request of the first customer based, at least in part, upon the first risk attribute calculated by the risk attribute module, with the first priority level indicating a recommended priority of the new service request;
wherein:
the risk attribute module is programmed to calculate a plurality of other-customer risk attributes respectively corresponding to a plurality of other customers; and
the priority-assignment module is programmed to assign the first priority level further based at least in part upon the plurality of other-customer risk attributes.

* * * * *